United States Patent [19]
Hagqvist et al.

[11] Patent Number: 5,581,776
[45] Date of Patent: Dec. 3, 1996

[54] BRANCH CONTROL SYSTEM FOR ROM-PROGRAMMED PROCESSOR

[75] Inventors: Jari Hagqvist, Oulu; Jukka Ranta, Salo, both of Finland

[73] Assignee: Nokia Mobile Phones Limited, Salo, Finland

[21] Appl. No.: 382,994

[22] Filed: Feb. 3, 1995

[51] Int. Cl.⁶ ................................................. G06F 9/00
[52] U.S. Cl. ..................... 395/590; 395/800; 364/232.8; 364/261.3; 364/DIG. 1
[58] Field of Search ..................................... 395/800, 375

[56] References Cited

U.S. PATENT DOCUMENTS

| | | | |
|---|---|---|---|
| 4,542,453 | 9/1985 | Patrick et al. | 395/375 |
| 4,860,197 | 8/1989 | Langendorf et al. | 395/375 |
| 4,870,573 | 9/1989 | Kawata et al. | 395/375 |
| 5,056,008 | 10/1991 | Ono | 395/375 |
| 5,193,205 | 3/1993 | Matuo et al. | 395/800 |
| 5,371,894 | 12/1994 | DiBrino | 395/800 |
| 5,450,556 | 12/1995 | Slavenburg et al. | 395/375 |
| 5,479,342 | 12/1995 | Sakamoto et al. | 364/184 |
| 5,506,976 | 4/1996 | Jaggar | 395/375 |

*Primary Examiner*—Alpesh M. Shah
*Attorney, Agent, or Firm*—Perman & Green

[57] ABSTRACT

A computer controlled apparatus includes a program counter for manifesting program count values and a processor for executing a prestored program in accordance with the program count values. The apparatus includes a read only memory with a prestored program that is accessible in response to generation of a span of program count values. Auxiliary memory includes a prestored program segment. A control circuit is coupled to the program counter and stores a predetermined program count value within the span of program count values in ROM. The control circuit is responsive to a match of a program count value from the program counter and the determined program count value to cause the program counter to be loaded with a branch program count value. That value enables the processor to immediately access and execute the prestored program segment from the auxiliary memory in lieu of a subspan of program count addresses in the ROM. The processor responds to the branch program count value as though it is a next program count value from a previous program count value, thereby seamlessly executing the second prestored program.

7 Claims, 1 Drawing Sheet

BRANCH CONTROL SYSTEM FOR ROM-PROGRAMMED PROCESSOR

FIELD OF THE INVENTION

This invention relates to a microprocessor that is operated in accord with a read only memory (ROM) program and, more particularly, to a system for enabling such a microprocessor to efficiently branch to an alternate program source when a portion of the ROM program is superseded.

BACKGROUND OF THE INVENTION

A microprocessor normally includes a program counter for controlling the sequence of executed program steps. The program counter increments through instruction addresses in the order in which they are to be executed. Each program counter output causes an instruction fetch from the program that controls the microprocessor. When a microprocessor is operated by ROM code, the program counter output increments down through the program addresses in the ROM, causing output of a sequence of ROM-contained instructions to the microprocessor for execution. Such a microprocessor is sometimes termed a "mask-programmed" processor. A mask-programmed microprocessor may also employ additional external ROM or downloadable random access memory (RAM).

When a ROM is employed for processor control, techniques are required for the handling of program errors or superseded program sequences. It is known that programs in external ROM/RAM can be more easily updated than a mask-programmed ROM and can further be employed as back-up in case errors are determined in the mask-programmed ROM. Such errors have been handled in the prior art by initially identifying the code within the mask-programmed ROM that is to be superseded. Then, upon reaching an initial code line of the superseded code, a signal is generated to a non-maskable interrupt input of the microprocessor, causing the microprocessor to respond with an interrupt, followed by a branch address. Such an operation requires a number of clock cycles to implement the interrupt state, fetch and execute the branch address, recover from the interrupt state, etc.

Accordingly, it is an object of this invention to provide an efficient means for providing substitute code for superseded ROM code.

It is a further object of this invention to provide a system for providing a substantially seamless jump to substitute code when superseded code is reached in a ROM.

SUMMARY OF THE INVENTION

A computer controlled apparatus includes a program counter for manifesting program count values and a processor for executing a prestored program in accordance with the program count values. The apparatus includes a read only memory with a prestored program that is accessible in response to generation of a span of program count values. Auxiliary memory includes a prestored program segment. A control circuit is coupled to the program counter and stores a predetermined program count value within the span of program count values in ROM. The control circuit is responsive to a match of a program count value from the program counter and the determined program count value to cause the program counter to be loaded with a branch program count value. That value enables the processor to immediately access and execute the prestored program segment from the auxiliary memory in lieu of a subspan of program count addresses in the ROM. The processor responds to the branch program count value as though it is a next program count value from a previous program count value, thereby seamlessly executing the second prestored program.

BRIEF DESCRIPTION OF THE DRAWING

The FIGURE is a block diagram of a system that implements the invention.

DETAILED DESCRIPTION OF THE INVENTION

Figure 1:
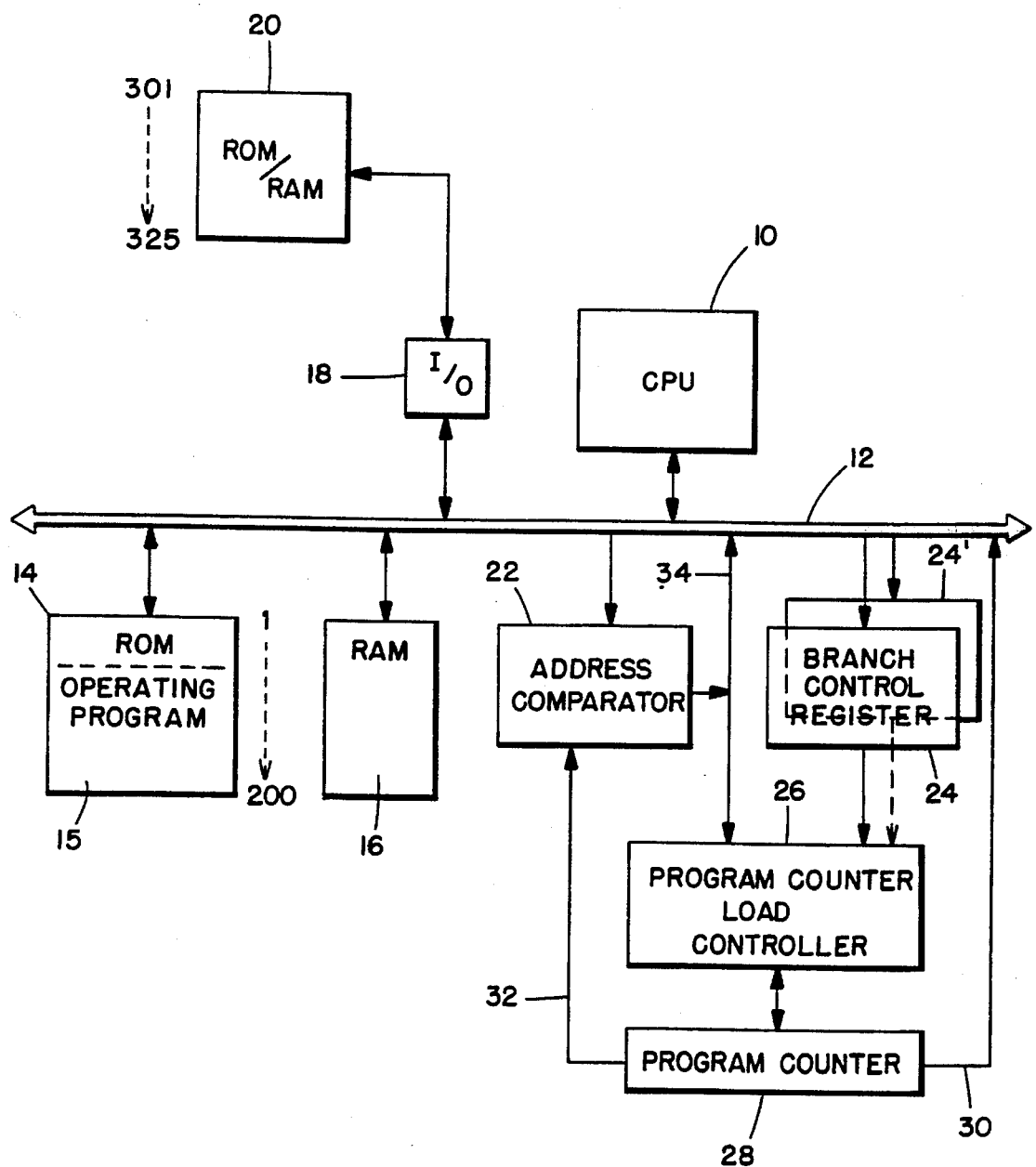

The FIGURE is a block diagram of a computer apparatus which includes a central processing unit (CPU) 10 that is connected by a bus system 12 to remaining components of the apparatus. A ROM 14 is connected to bus 12 and includes an operating program 15 which is executed by CPU 10. A random access memory (RAM) 16 is connected to bus 12 and provides a volatile data storage facility for the apparatus. An input/output (I/O) module 18 provides access to an auxiliary storage module 20 which stores a segment of code that is to be substituted for a portion of code in operating program 15. Auxiliary storage module 20 may be configured as either a RAM or a ROM. The circuitry which enables CPU 10 to know when to branch to the code listing in auxiliary storage module 20 comprises an address comparator 22, a branch control register 24, a program counter load controller 26 and a program counter 28. As will be understood hereafter, plural branch control registers (e.g. 24') can be provided.

For purposes of the description below, it is assumed that the operating program 15 in ROM 14 includes 200 lines of code having addresses 1–200. It is further assumed that addresses 101–125 have been superseded by substitute code that is present in auxiliary storage module 20 at addresses 301–325.

Branch control register 24 is initially loaded with a program count value at which a branch action is to occur to an alternate address. In addition, branch control register may include a register position for receiving a next program count value from a last code line of a substitute code segment from auxiliary storage module 20. Without this register position, the substitute code must include, as its last entry, a "branch-to" instruction which causes a return to the original code listing. Branch control register 24 may be loaded via an external interface (not shown) that is connected to bus system 12, such as a JTAG, DMA or other comparable access circuit.

Under normal circumstances, CPU 10, in combination with ROM 14, executes succeeding lines of code in operating program 15 under control of program count outputs from program counter 28 (that are applied to bus 12 via line 30). Each program count value is also fed via line 32 to address comparator 22. Previously, registers within address comparator 22 have been loaded with address values which define the count at which a branch action is to commence and the end count of the branch action. At all times other than when an address match occurs in address comparator 22, signals fed from CPU 10 via line 34 cause program counter load controller 26 to increment program counter 28 in the normal fashion.

When the program count output from program counter 28 matches the pre-loaded address value in address comparator 22, a control output issues therefrom and is fed to program counter load controller 26. In response, program counter load controller 26 causes the value stored in branch control register 24 to be loaded into program counter 28. As a result, the next output program count is the value that was previously stored in branch control register 24. In response, CPU 10 is fed the branch control register value as the next instruction count. Hence, program execution continues in a seamless fashion from the address specified by the branch control register.

At the termination of the branch program, program counter 28 (which has continued to be incremented) reaches the end count of the substitute program. When that value issues on line 32, address comparator 22 (which as indicated above has been loaded with the end count value) recognizes a match and causes program counter load controller 26 to load a next address value in operating program 15 into program counter 28. Accordingly, CPU 10 accesses the next address value in operating program 15 and continues to run in a seamless fashion until completion. As indicated above, this latter action may be superseded if the substitute code includes a last "branch-to" instruction. Such a branch instruction causes a return to the main program in a slightly slower fashion but saves a branch control register for another use.

Turning to the exemplary address values illustrated in the FIGURE, CPU 10 will normally access addresses 1–200 from operating program 15 and executes them in the serial fashion. Each time an address is accessed, program counter 28 is incremented to a next value. Assume, however, that addresses 101–125 in ROM 14 have been replaced by addresses 301–325 in auxiliary storage module 20. When program counter 28 manifests a value of 101, that value is determined by address comparator 22 to match a prestored value of 101 therein. As a result, address comparator 22 issues a control signal to program counter load controller 26 which causes a program count of 301 to be written from branch control register 24 into program counter 28. CPU 10 then responds to program count 301 (which issues from program counter 28) by accessing, via I/O module 18, address 301 in auxiliary storage module 20.

Program counter 28 continues to be incremented as CPU 10 steps down through addresses 301–325. When program counter 28 reaches address 325, that value is passed to address comparator 22 into which the value 325 has also been previously loaded (as the end Count of the substitute program). Upon determining a match, address comparator 22 issues a signal to program counter load controller 26 which causes a program count of 126 to be loaded from branch control register 24 into program counter 28. When CPU 10 next accesses program counter 28, address value 126 is outputted onto line 30. CPU 10 thus access's address 126 in operating program 15 in ROM 14. The program then continues down the remaining addresses in operating program 15 until its termination.

Additional branching operations can be implemented by utilizing additional branch control registers 24' and assuring that address comparator 22 is appropriately loaded with both the beginning and end count values of the code to be replaced. While it has been assumed that the replacement code resides in auxiliary storage module 20, the correction software can alternatively be downloaded into RAM 16 for execution. Hence, an external processor can be utilized to download the necessary code via I/O module 18. Further, while RAM 16 is shown as internal to the computer apparatus, it may be external memory which stores the replacement code for execution purposes. The correction software can also be programmed into a small internal EEPROM or a flash ROM in order to avoid having to download RAM 16 after every power-down/up. The software in the flash ROM or EEPROM can also be run at every power-up to initialize the addresses within address comparator 22 and branch control register 24.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. Computer apparatus comprising:

a program counter for manifesting program count values;

processor means coupled to said program counter for executing a program in accordance with said program count values;

read only memory means coupled to said processor means and including a first program that is addressable in accordance with a span of program count values;

auxiliary memory means coupled to said processor means and including a program segment;

control means coupled to said program counter and said processor means and storing both a determined program count value within said span of program count values and an initial program count value that enables access to said program segment, said control means responsive to a match of a program count value manifested by said program counter and said determined program count value to cause said program counter to output said initial program count value, said processor means responding to said initial program count value by executing said program segment.

2. The computer apparatus as recited in claim 1 wherein said control means comprises an address comparator which, upon determining a match of a program count from said program counter and said determined program count value, causes a branch program count value to be loaded into said program counter, said processor means responding to said branch program count value by next executing a first line of code in said program segment.

3. The computer apparatus as recited in claim 2 wherein said control means further includes a branch control register for storing said branch program count value, said branch control register responsive to a match output from said address comparator to load said branch program count value into said program counter.

4. The computer apparatus as recited in claim 3 wherein said address comparator further includes a value that enables determination of a code listing in said span of program count values that defines an end code line of a code listing that is superseded by said program segment; and said branch control register includes both a branch program count value and an end branch program count value which, together, define a length of lines of code that comprise said program segment.

5. The computer apparatus as recited in claim 4 wherein said branch control register is connected so as to be accessible from an external source to enable loading of addresses thereinto.

6. The computer apparatus as recited in claim 3 wherein said program segment terminates with a branch instruction to said first program.

7. The computer apparatus as recited in claim 1 wherein said auxiliary memory means is coupled to said computer apparatus via an input/output port.

\* \* \* \* \*